United States Patent
Barber et al.

(10) Patent No.: US 7,484,768 B2
(45) Date of Patent: Feb. 3, 2009

(54) CONNECTOR

(75) Inventors: David Barber, Norwich (GB); Rowan Patterson, Beccles (GB)

(73) Assignee: Claxton Engineering Services Limited, Norwich (GB)

( * ) Notice: Subject to any disclaimer, the term of this patent is extended or adjusted under 35 U.S.C. 154(b) by 0 days.

(21) Appl. No.: 11/613,408

(22) Filed: Dec. 20, 2006

(65) Prior Publication Data

US 2007/0184683 A1    Aug. 9, 2007

(30) Foreign Application Priority Data

Dec. 22, 2005   (GB) ................... 0526137.5
Feb. 15, 2006   (GB) ................... 0602983.9

(51) Int. Cl.
*F16L 35/00* (2006.01)
(52) U.S. Cl. .................... 285/24; 439/190
(58) Field of Classification Search ........ 439/191, 439/194, 374, 190; 285/314, 315, 24
See application file for complete search history.

(56) References Cited

U.S. PATENT DOCUMENTS

| 3,488,031 | A |   | 1/1970 | Bezner et al. |
| 3,724,501 | A | * | 4/1973 | Scott ............ 137/630.19 |
| 4,223,920 | A | * | 9/1980 | Van Bilderbeek ...... 285/24 |
| 6,554,324 | B1 |  | 4/2003 | Herman |
| 2005/0126788 | A1 | | 6/2005 | Crozier |

FOREIGN PATENT DOCUMENTS

| GB | 1 512 317 | 6/1976 |
| GB | 2 195 731 | 4/1988 |
| GB | 2 340 572 | 2/2000 |

* cited by examiner

*Primary Examiner*—Khiem Nguyen
(74) *Attorney, Agent, or Firm*—Burr & Brown (57) ABSTRACT

A connector for underwater connection of two fluid carrying conduits comprises initial engagement means to provide an initial engagement between a male component and a female receptacle. The final connection is made by operating a drive which reacts against the initial engagement means to move the component into a fully connected position. A number of sealing means may be provided to enable a pressure tight connection.

10 Claims, 10 Drawing Sheets

CONNECTOR

BACKGROUND a. Field of the Invention

The present invention relates to a connector and in particular to a male/female connector for use in underwater applications. Such connectors are often referred to as "stab" connectors.

b. Related Art

It is conventional to use a remotely operated vehicle (ROV) to make a connection to a pipeline head for test purposes, For example, sending a pig along the pipeline to remove detritus or to confirm the diameter of the pipeline. Such a connection is made using a relatively small hose when compared to the pipelines used for transporting oil or gas. Typically, the ROV is used to introduce a male component into a female component (or receptacle) and then to force the component into the receptacle to provide a suitable, pressure tight connection.

SUMMARY OF THE INVENTION

According to the invention there is provided a connector comprising a male component and a female receptacle, wherein the male component is to be connected into the female receptacle to establish a fluid flow path between the male component and the female receptacle, the male component having means for making initial engagement with the receptacle and means for pulling itself fully into the receptacle by pushing against the initial engagement means.

The male component can be gripped and manipulated underwater by a ROV, and stabbed into the female receptacle sufficiently far to make initial engagement. Initial engagement can be achieved without the male component encountering the sealing means in the receptacle, and thus without encountering any substantial resistance to insertion. The ROV does not therefore have to exert significant axial force to the male component.

The male component is preferably at the end of a flexible hose and the female receptacle is part of a manifold assembly for a subsea pipeline.

The female receptacle may have an outwardly flared end to assist in guiding the male component into the receptacle, and the male component can have a rounded end to assist in guiding the male component into the receptacle.

The female receptacle preferably comprises a tubular body with a branch passage between its ends, and the male component has a central bore, a closed end and a lateral opening or openings at one point around its circumference, the lateral openings being adapted to communicate with the branch passage when the male and female components are fully engaged with one another. Sealing means are preferably provided between the male and female components in the fully engaged position.

The means for making initial engagement with the receptacle can comprise bayonet slots on the female receptacle, and radial projections on the male component (or vice versa). Alternatively the means for making initial engagement with the receptacle can comprise expanding collets on the male component which expand to lock behind ridges on the female receptacle.

The means for pulling the male component fully into the receptacle can comprise a rack and pinion arrangement working between a part of the male component which Is initially engaged with the female receptacle, and a part of the male component which incorporates a fluid flow passage and is to be driven fully into the receptacle.

In an alternative embodiment, the means for pulling the male component fully into the receptacle can comprise hydraulic rams working between a part of the male component which is initially engaged with the female receptacle, and a part of the male component which incorporates a fluid flow passage and is to be driven fully into the receptacle.

The invention also extends to a method of connecting a male component into a female receptacle in a subsea environment where the male component is to be connected into the female receptacle to establish a fluid flow path between the male component and the female receptacle, wherein part of the component is introduced into the female receptacle to engage initial engagement means, and then the male component drives Itself fully into the female receptacle by reacting against the initial engagement means.

The male component preferably carries a drive mechanism to drive itself fully into the receptacle.

DETAILED DESCRIPTION

Figure 1:
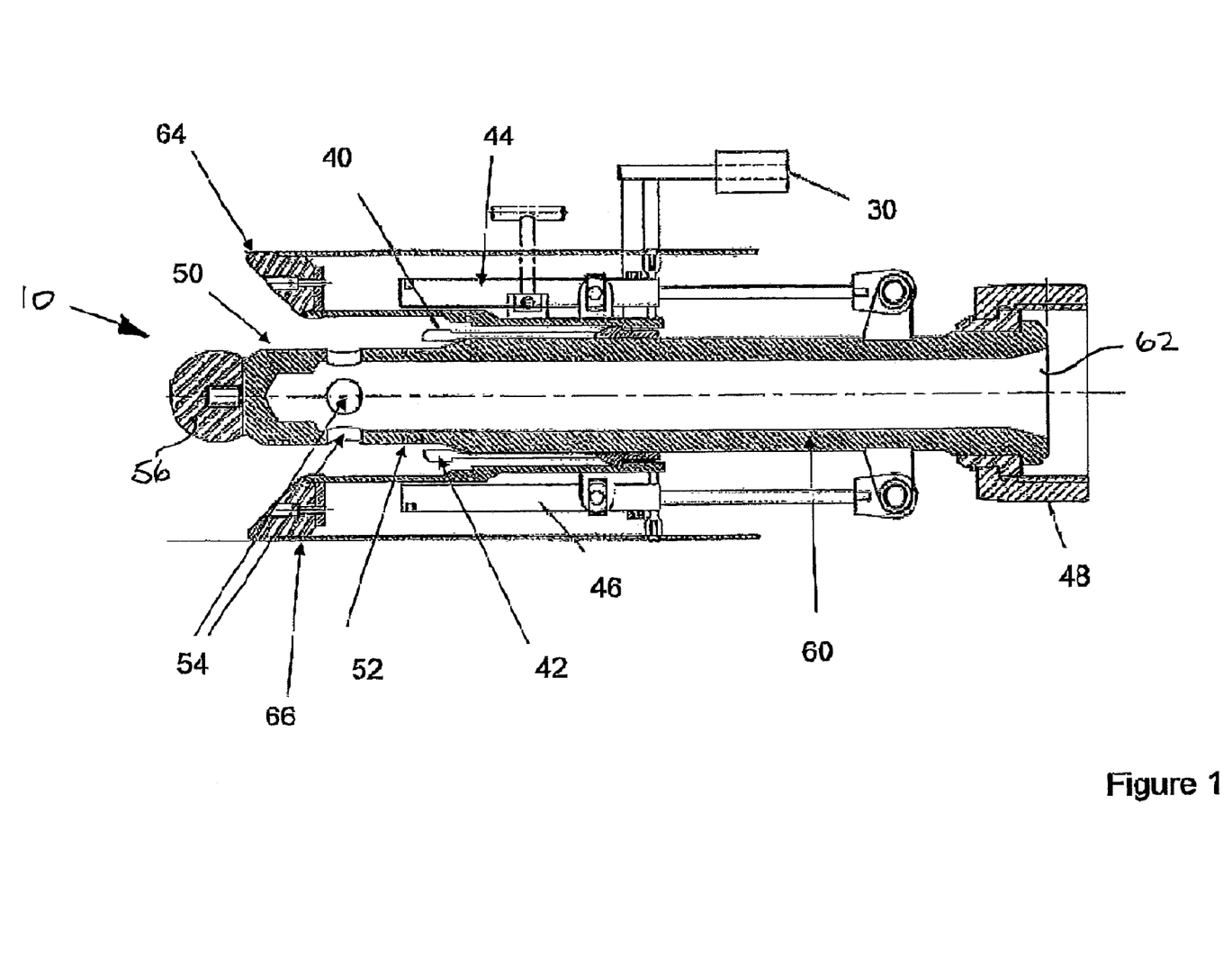
FIG. 1 shows a schematic depiction of a male component according to the present invention.

FIG. 1 shows a schematic depiction of a male component 10 according to a first embodiment of the present invention. The male component 10 comprises a cylindrical body 60 with a hollow bore 62. A first end of the body 60 has a rounded nose 56 and the opposite end of the body has a component 48 for onward connection to a line or hose (not shown). First and second arms 64 and 66 are attached to either side of the cylindrical body 60 and first and second hydraulic actuators 44 and 46 are connected to the first and second arms 64 and 66 respectively and to the cylindrical body 60. The rounded nose 56 projects beyond the first and second arms 64 and 66 so that the first and second arms do not interfere with leading end of the male component when this is inserted into a receptacle.

The first hydraulic actuator 44 is coupled to a first collet finger 40 and, similarly, the second hydraulic actuator 46 is coupled to a second collet finger 42. Near to the first end of the body there is provided one or more apertures 54 that enable a fluid to flow from the hollow bore 62 into a receptacle (see below), or vice versa. The male component 10 comprises a first seal means 50 that is located in between the nose 56 and the apertures 54 and a second seal means 52 is located between the apertures 54 and the collet fingers 40, 42. A handle 30 is provided to allow the component to be manipulated and maneuvered by a remotely operated vehicle (ROV).

Figure 2:
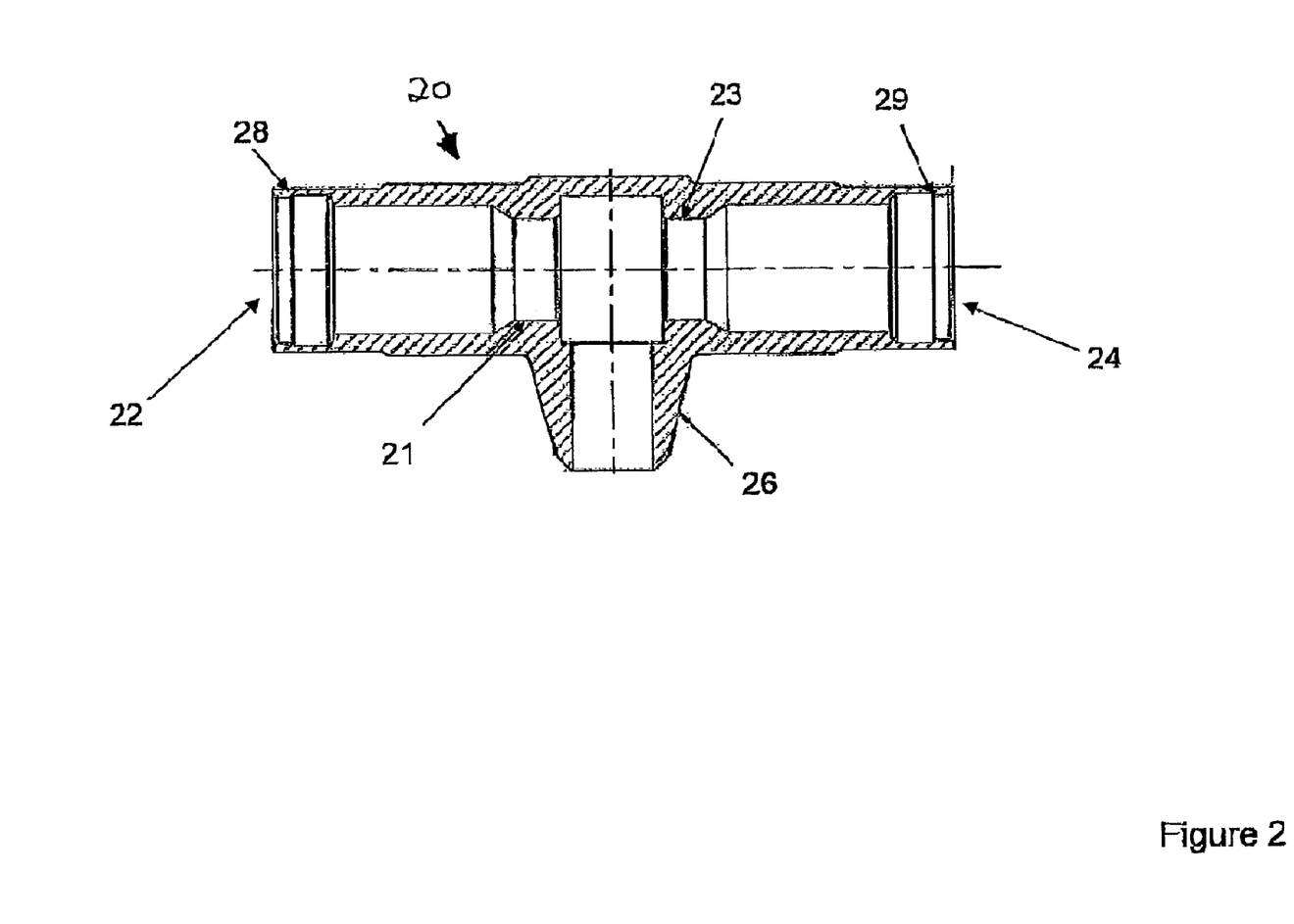
FIG. 2 shows a schematic depiction of a female receptacle for use with the component shown in FIG. 1.

FIG. 2 shows a schematic depiction of a female receptacle for use with the component shown in FIG. 1. The receptacle 20 is a T-component that comprise first and second pipeline apertures 22, 24 and a manifold component 26. In use, a male component 10 will be connected to either the first or the second of the pipeline apertures 22, 24 to allow fluid to flow from a line or hose connected to the male component to the manifold, or vice versa. The receptacle further comprises first and second sealing lands 21, 23 and the pipeline apertures 22, 24 have first and second aperture engagement means 28, 29.

Figure 3:
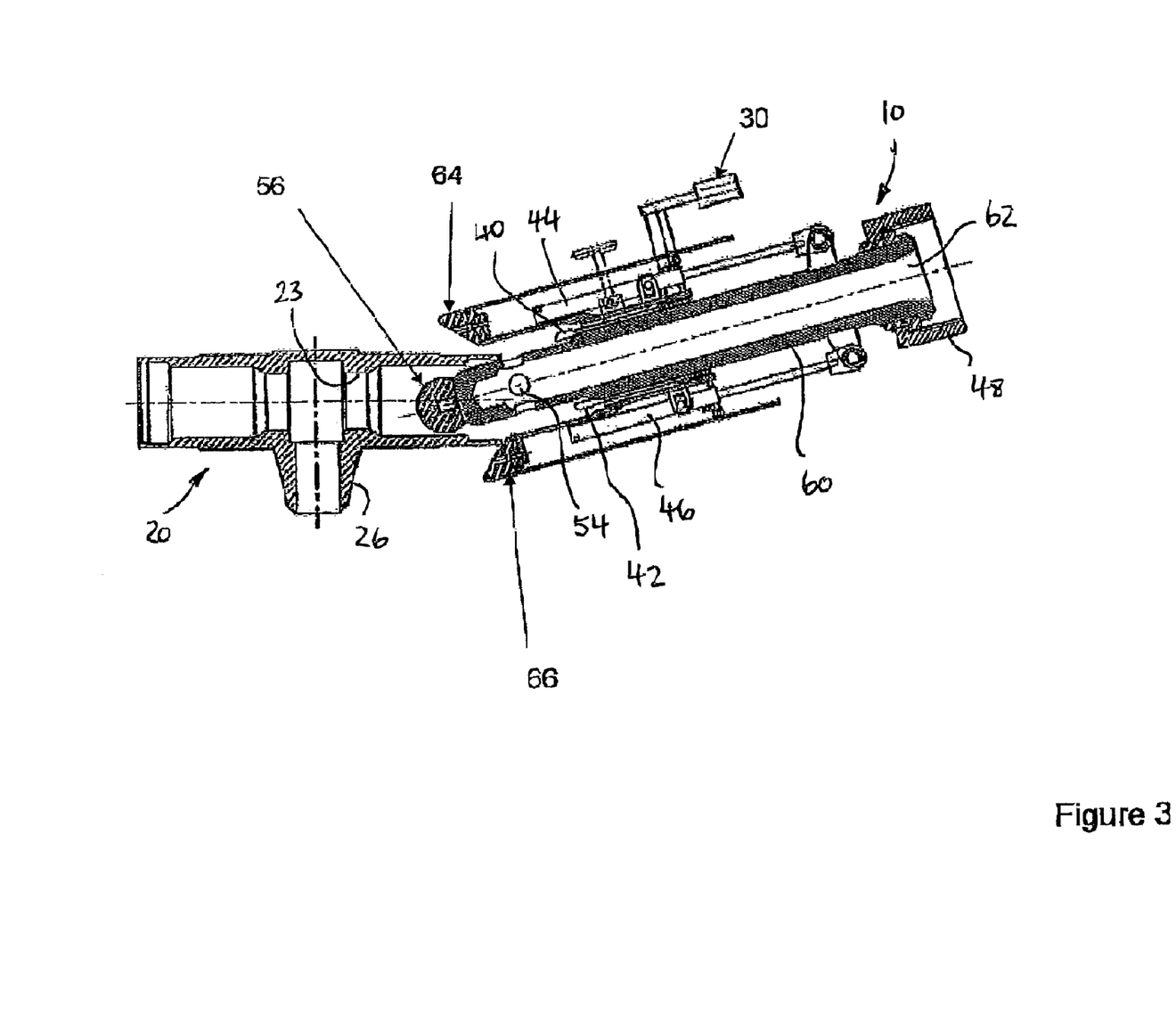
FIGS. 3 to 7 show the different stages by which a male component according to a first embodiment of the present invention is coupled to a receptacle as shown in FIG. 2.
Figure 4:
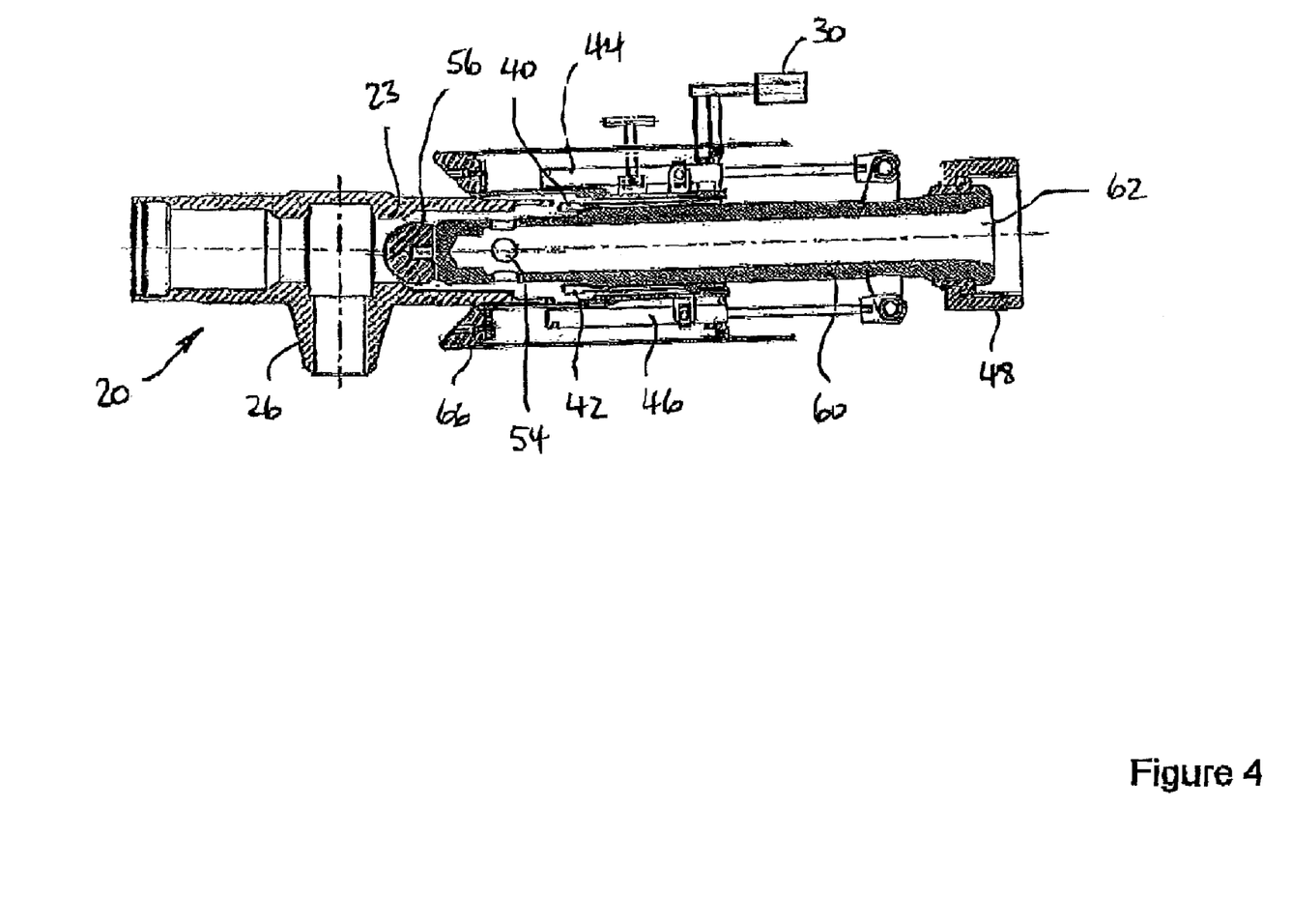

FIGS. 3 to 7 show the different stages by which a male component according to a first embodiment of the present invention is coupled to a receptacle. FIG. 3 shows the initial insertion of the component into a receptacle. The ROV is used to tilt the component relative to the receptacle such that the component is inserted into the receptacle at an angle. Once the nose 56 is received within the receptacle then the component 10 is oriented, through appropriate movement of the ROV, such that it is substantially coaxially aligned with the receptacle. (see FIG. 4) with the first end of the component loosely received within the receptacle.

Figures 5, 5A:
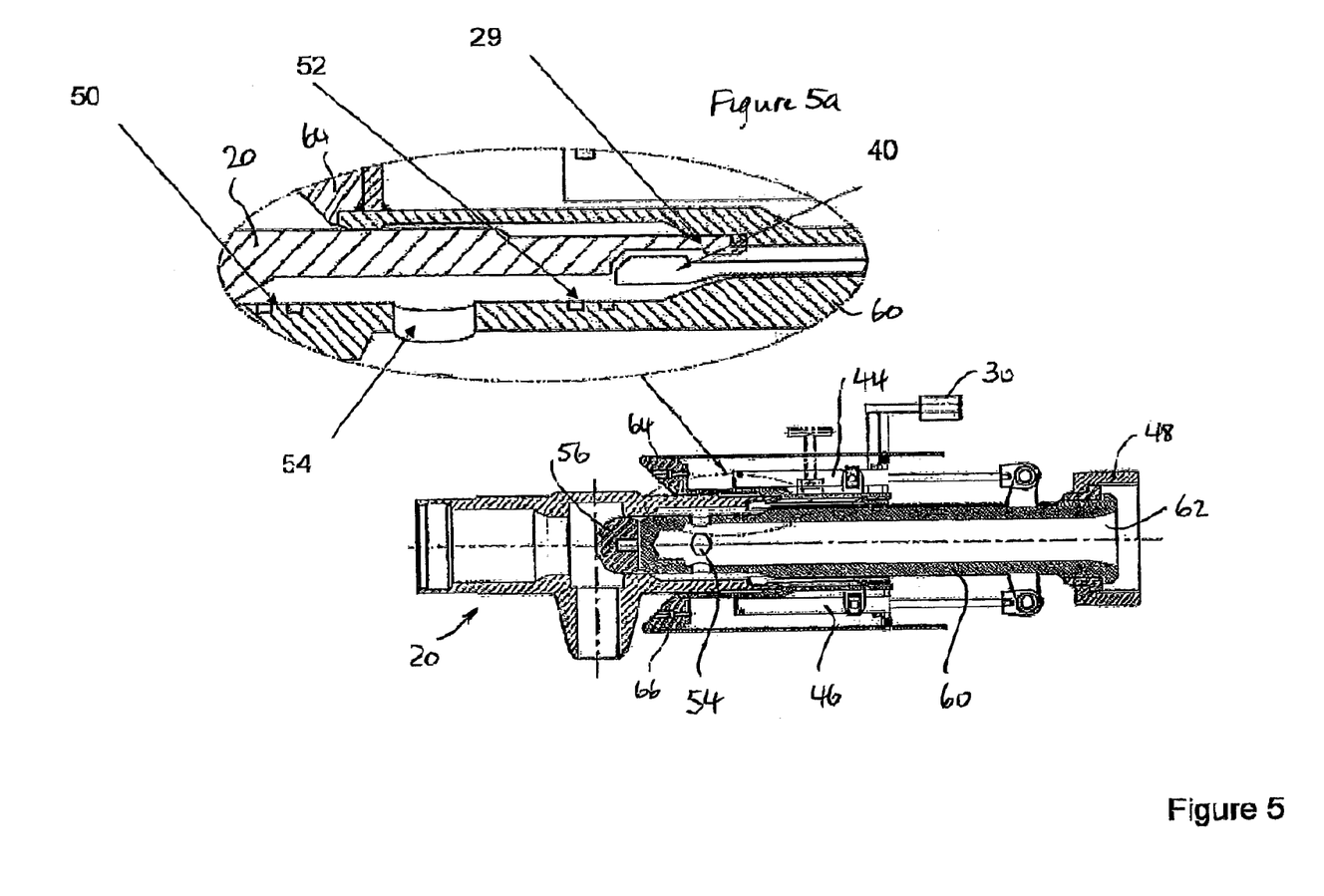

FIGS. 5 and 5a show the position of the component once the guide means 56 has passed the second receptacle engagement means 23 (the following description of the present invention is predicated on the insertion of the component into the second pipeline aperture 24. It will be readily understood that the component could equally be inserted into the first pipeline aperture). The component is inserted up to this point through the action of the ROV on the component FIG. 5a shows that the first collet finger 40 has been brought into close proximity with the second aperture engagement means 29 (although it is not shown in detail it will be understood that the second collet finger 42 has similarly been brought into close proximity with the second aperture engagement means 29).

At this stage, the ROV has completed its part in making the connection.

Figures 6, 6A:
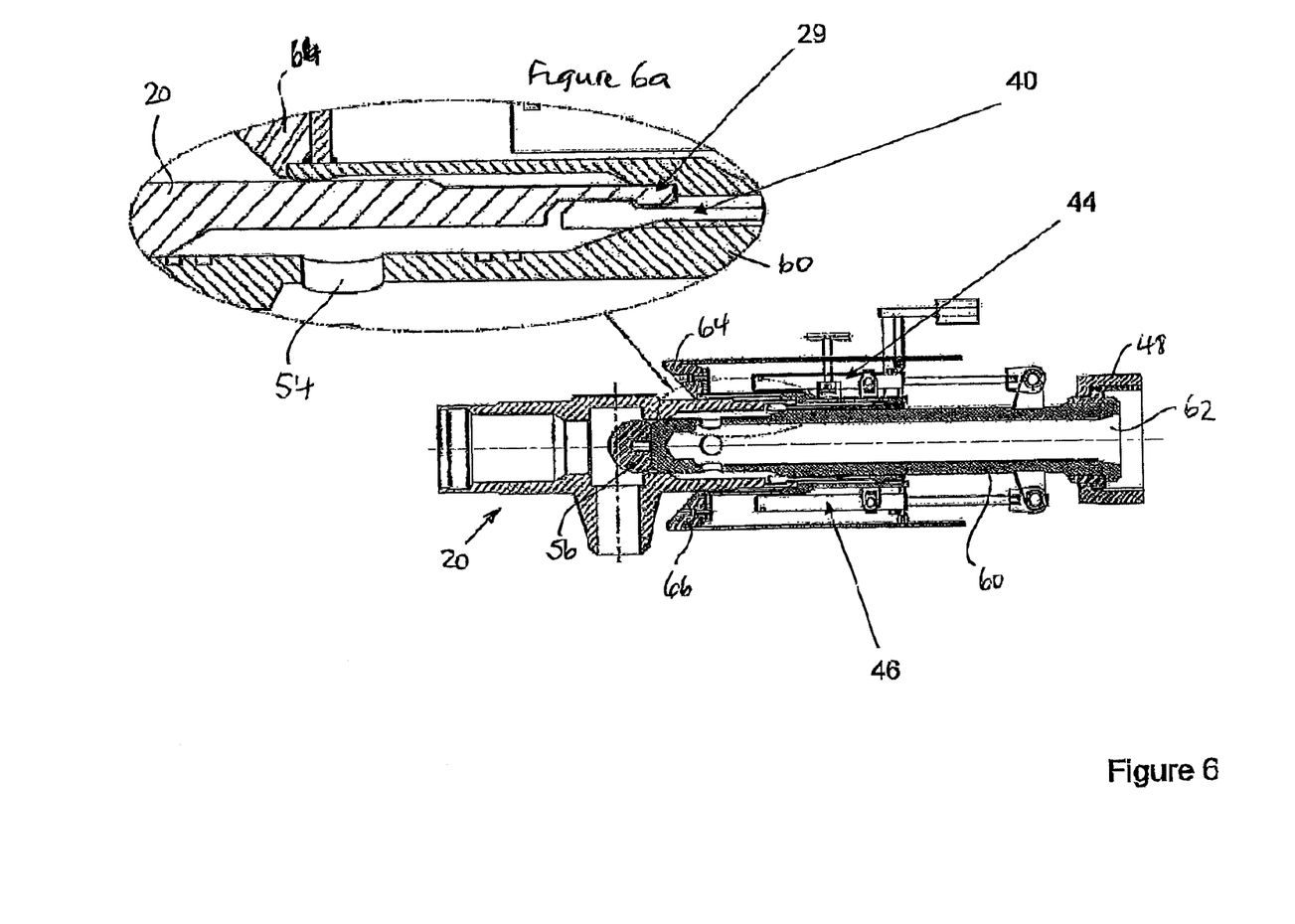
Figures 7, 7A:
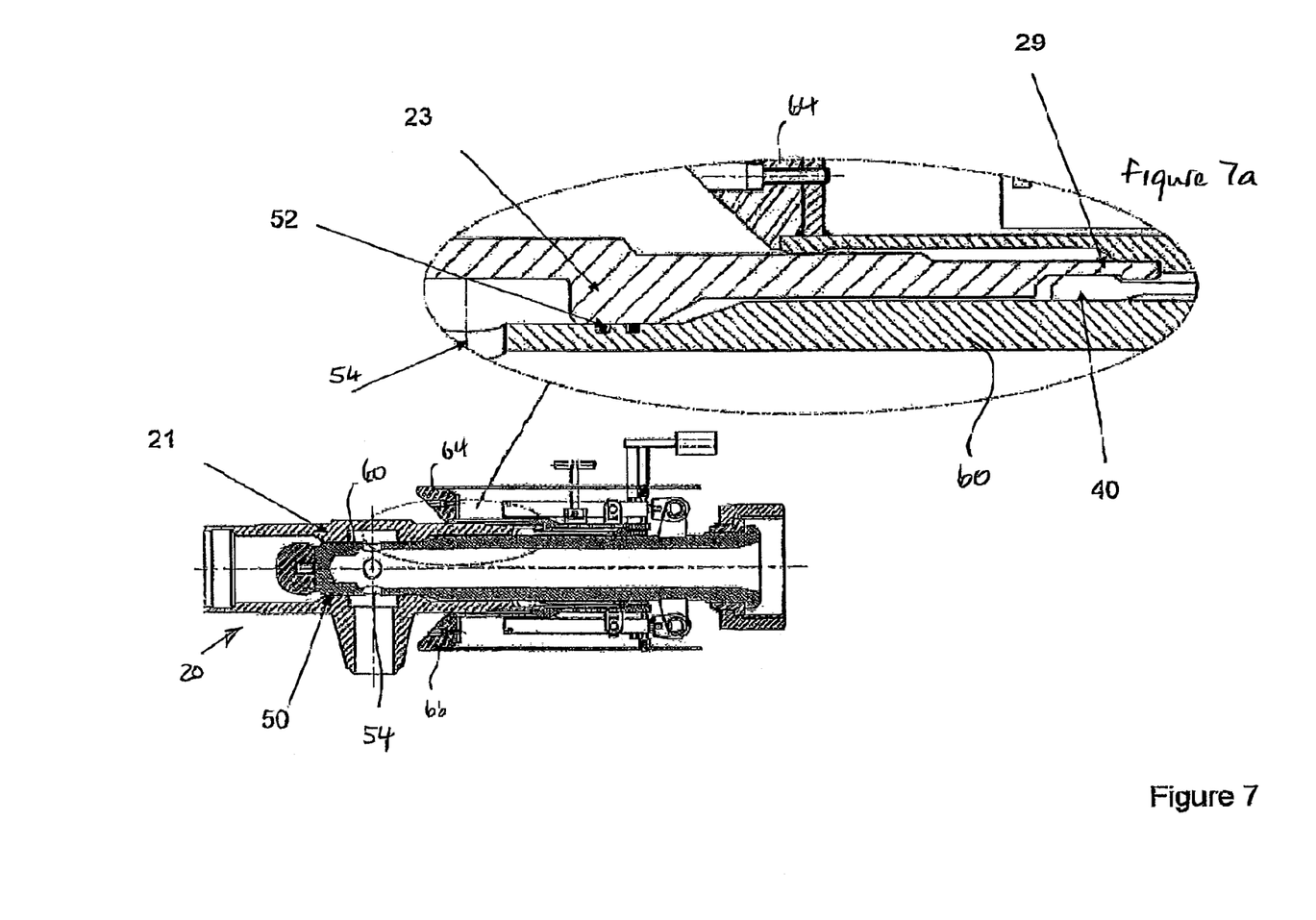

The next stage in the process of connecting the component to the receptacle is for the hydraulic cylinders 44, 46 to be activated to cause the collet fingers to engage with the second aperture engagement means 29 (see FIG. 6). The action of the hydraulic cylinders cause the collet fingers to be deflected away from the body of the component to engage with the engagement surface of the second aperture engagement means 29 (see FIG. 6a). This engagement of the collet fingers 40, 42 with the second aperture engagement means 29 the component to be secured to the receptacle.

The hydraulic cylinders 44, 46 are then activated to retract the pistons into the cylinders. Because the component is secured to the receptacle through the engagement of the collet fingers with the second aperture engagement means, the retraction of the hydraulic cylinders causes the body of the component to be drawn further into the receptacle, such that the first seal means 50 on the body 60 seal on the first sealing lands 21 and the second seal means 52 seal on the second sealing lands 23. This positioning of the component causes the first and second pipeline apertures to be sealed such that any fluid flowing through from the manifold component 26 will flow through a line or hose (not shown) that is connected to the component 48, and vice versa.

Figure 8:
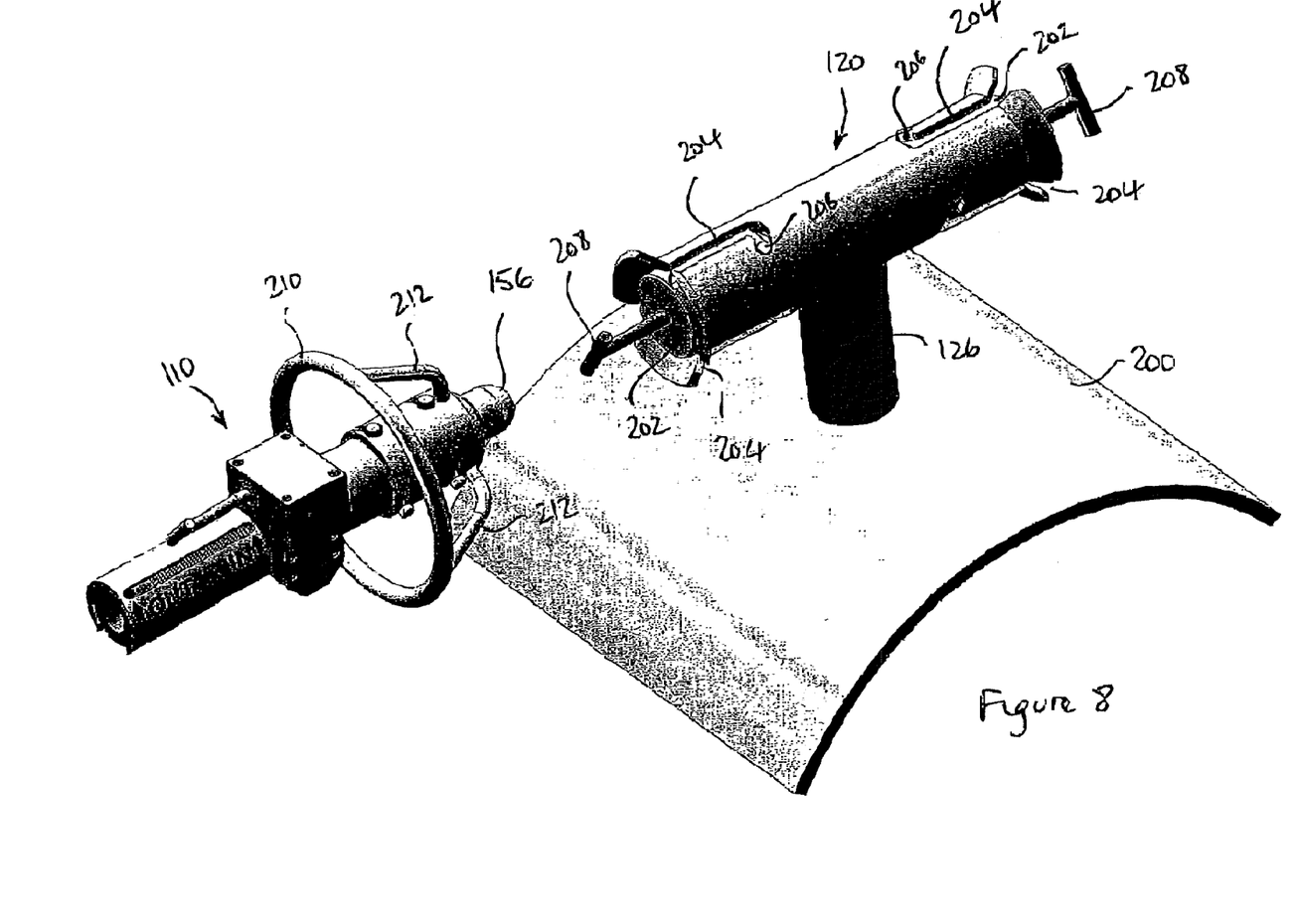
FIG. 8 Is a perspective view of a second embodiment of the invention, with the female receptacle shown mounted on a scrap section of pipeline.

FIG. 8 shows an external view of a connector. In this view, and in FIGS. 9 and 10, components which have similar functions to those already described carry the same reference numeral indexed by 100.

The female receptacle 120 has a stem 126 which is fixed in the wall of a pipeline 200. It will be appreciated that only a part of the pipeline is shown in this figure. The receptacle has two ends 122 and 124, and in FIG. 8, both ends are shown closed with sealing plugs 202. The receptacle has two ends, although only one end will have a component connected to it at any one time. As the orientation of the pipeline 200 on the seabed can vary, one end may he inaccessible but there will always be one end which is accessible for the connection of the male component.

It will be seen that the receptacle 120 has bayonet slots 204 at both ends, and the sealing plugs 202 have radial lugs 206 which engage in the slots. The plugs also have handles 208 which are designed so that they can be gripped by an ROV.

The male component 110 has an annular ring bar 210 connected to the component by legs 212. The positions of the legs and the points at which they connect to the body of the component are set to line up with the bayonet slots 204. When the sealing plugs 202 have been extracted from the receptacle, the component 110 can be inserted by an ROV so that the legs 212 enter the slots 204 When fully inserted into the slots, a small rotation engages the legs in the ends of the slots.

Figure 9:
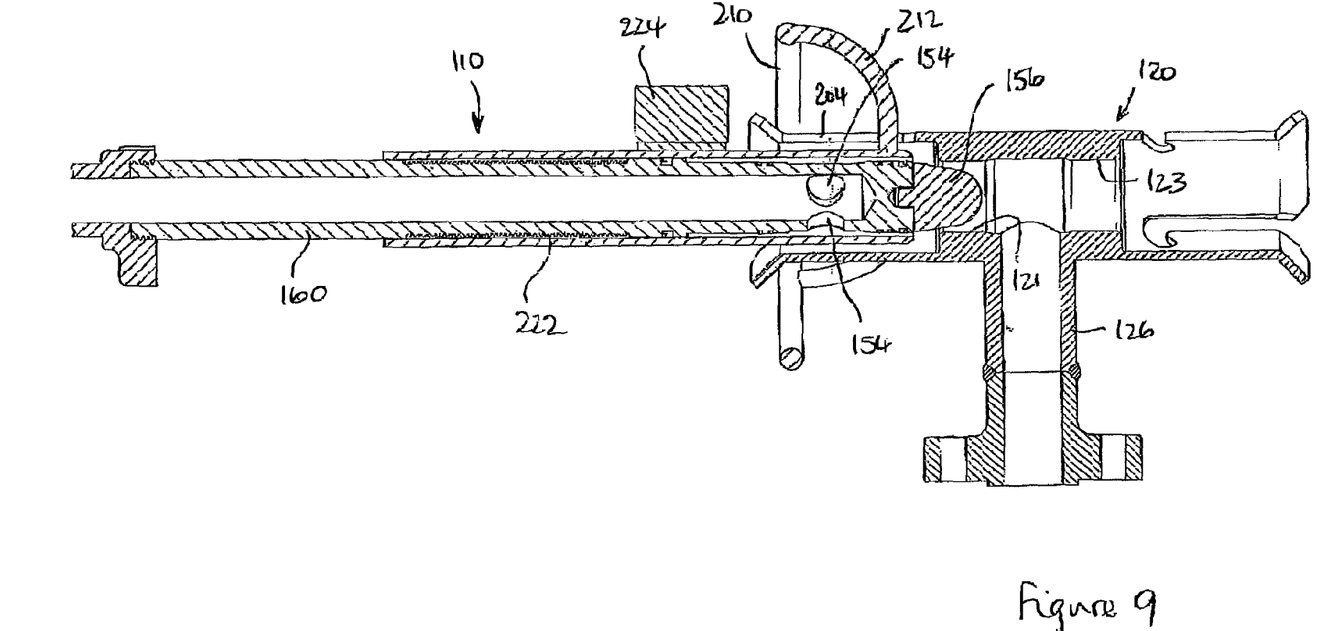
FIG. 9 is a cross-section through a third embodiment of the invention, similar in principle to the second embodiment.
Figure 10:
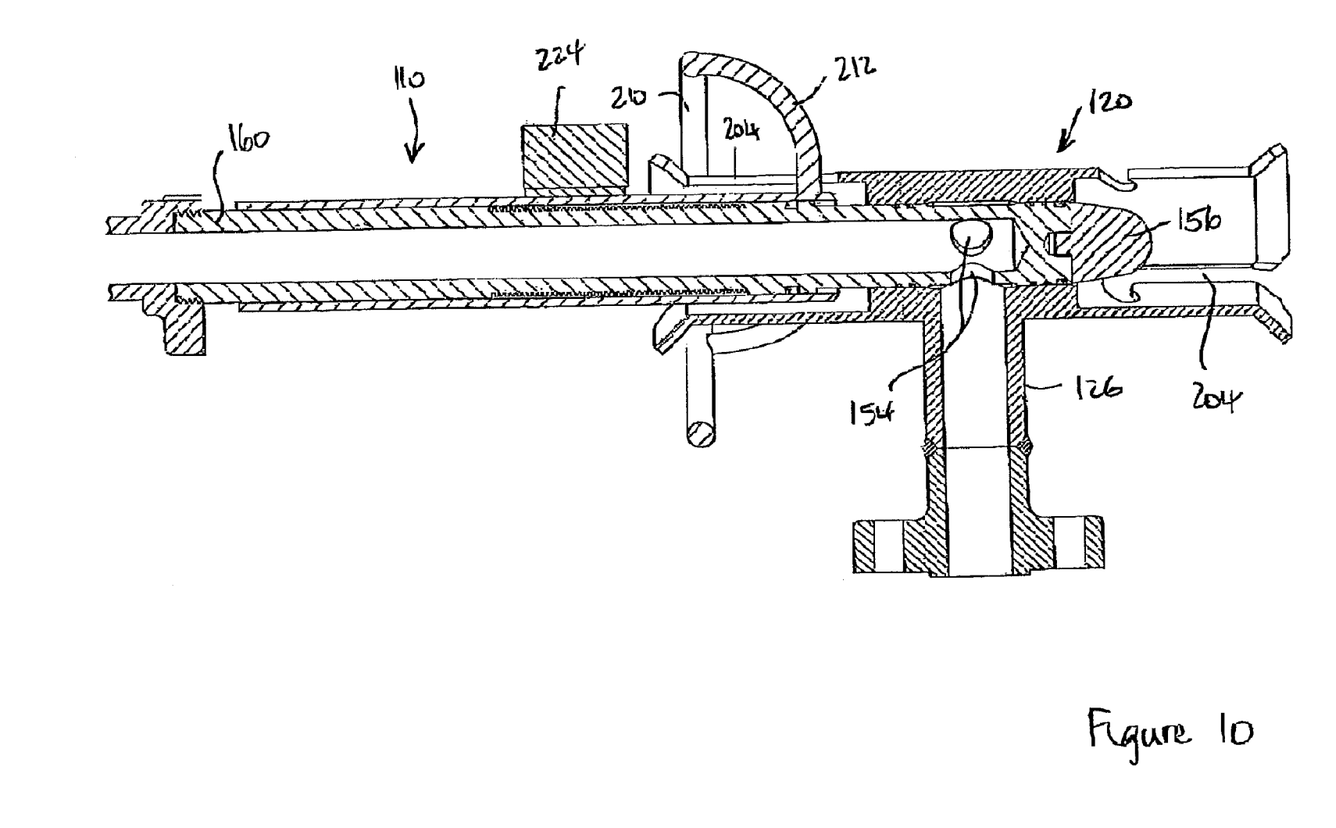
FIG. 10 is a cross-section through the embodiment of FIG. 10, showing the component fully connected.

Reference is now made to FIGS. 9 and 10. FIG. 9 shows the position where the component 110 is initially engaged in the receptacle, with the legs 212 engaged in the bayonet slots 204. At this point, the nose 156 of the component still lies behind the sealing lands 121, 123. A drive mechanism, indicated schematically in FIGS. 8 to 10, consists of a sot of circumferential gear tooth shaped grooves 222 formed in the outer surface of the body 160. A gearbox 224 mounted on the component 110 includes a pinion which engages in the grooves 222, and which can be rotated to drive the body 160 to the right in FIG. 9, until it lakes up the position shown in FIG. 10, where the apertures 154 are in communication with the limb 126 of the receptacle. Seals (not shown in detail in FIGS. 9 and 10). will be in place between the sealing lands 121 and 123 and the adjacent surfaces of the body 160.

FIGS. 8, 9 and 10 clearly show the flared ends of the receptacle passages which will assist in locating the nose 16 of the component 110 in one or other of the passages.

To locate the component fully in the receptacle requires a significant amount of force to push (or "stab") the component with its sealing rings 50 through the lands 121, 123. The invention allows the initial insertion by ROV up to the point where significant force has to be exerted, and then the further insertion operation is carried out against the engagement of the component with the initial engagement means in the receptacle which provides a reaction surface against which the drive mechanism can operate.

It should be understood that although FIGS. 8 to 10 indicate that the component comprises a male bayonet connecting means that can be connected to a female bayonet connecting means received on the receptacle, this situation may be reversed such that the component comprises a female bayonet connecting means that can be connected to a male bayonet connecting means received on the receptacle.

It will be readily understood that the connector may be modified or varied in a number of ways without departing from the teaching of the present invention. For example, the component may be provided with three (or more) hydraulic cylinders and their respective collet fingers to provide the engagement with the receptacle. Alternatives to the hydraulic cylinders may be used, for example electrical or pneumatic drive systems, although hydraulic systems are generally preferred in the subsea environment in which the present invention is to be used. A connector according to the present invention would be used in applications where conventionally that a pipeline has a diameter of 2-4 inches (50-100 mm) but it will be understood that the present invention is also suitable for use with pipelines of a larger or smaller diameter.

The invention claimed is:

1. A connector comprising a male component and a female receptacle, wherein the male component is to be connected into the female receptacle to establish a fluid flow path between the male component and the female receptacle, the male component having means for making initial engagement with the receptacle and means for pulling itself fully into the receptacle by pushing against the initial engagement means, and the female receptacle comprising a body with a tubular bore open at both ends to accept the male component from either end, and a branch passage between the ends of the bore and opening into the bore, wherein the male component has a central bore, a closed end and a lateral opening or openings at one point around its circumference, the lateral openings being adapted to communicate with the branch passage when the male and female components are fully engaged with one another to establish a flow path between said central bore of the male component, through one or more of the said lateral openings and into said branch passage.

2. A connector as claimed in claim 1, wherein the male component is at the end of a flexible hose and the female receptacle is part of a manifold assembly for a subsea pipeline.

3. A connector as claimed in claim 1, wherein the male component has means by which a remotely operated subsea vehicle can grip and manipulate the male component.

4. A connector as claimed in claim 1, wherein the female receptacle has an outwardly flared end to assist in guiding the male component into the receptacle.

5. A connector as claimed in claim 1, wherein the male component has a rounded end to assist in guiding the male component into the receptacle.

6. A connector as claimed in claim 1, wherein sealing means are provided between the male and female components in the frilly engaged position.

7. A connector as claimed in claim 1, wherein the means for making initial engagement with the receptacle comprises bayonet slots on the female receptacle, and radial projections on the male component.

8. A connector as claimed in claim 1, wherein the means for making initial engagement with the receptacle comprises expanding collets on the male component which expand to lock behind ridges on the female receptacle.

9. A connector as claimed in claim 1, wherein the means for pulling the male component fully into the receptacle comprise a rack and pinion arrangement working between a part of the male component which is initially engaged with the female receptacle, and a part of the male component which incorporates a fluid flow passage and is to be driven fully into the receptacle.

10. A connector as claimed in claim 1, wherein the means for pulling the male component frilly into the receptacle comprises hydraulic rams working between a part of the male component which is initially engaged with the female receptacle, and a part of the male component which incorporates a fluid flow passage and is to be driven fully into the receptacle.

* * * * *

UNITED STATES PATENT AND TRADEMARK OFFICE
CERTIFICATE OF CORRECTION

PATENT NO.         : 7,484,768 B2
APPLICATION NO. : 11/613408
DATED              : February 3, 2009
INVENTOR(S)        : David Barber and Rowan Patterson

It is certified that error appears in the above-identified patent and that said Letters Patent is hereby corrected as shown below:

Column 6

*Lines 3 and 20:* please change "frilly" to --fully--

Signed and Sealed this

Eighteenth Day of August, 2009

David J. Kappos
*Director of the United States Patent and Trademark Office*